Figure 1:
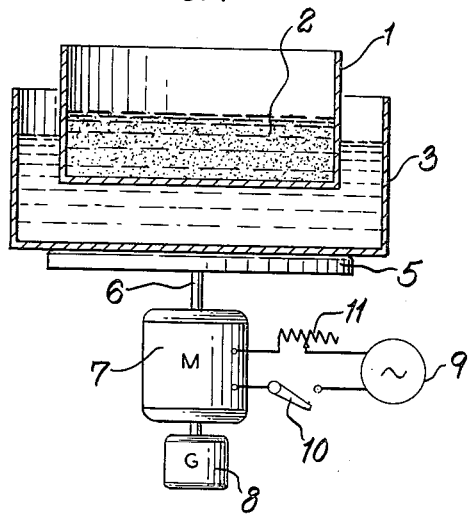

Nov. 28, 1961     B. J. BITTNER     3,010,153
CONSTRUCTION OF PARABOLOID SURFACES

Filed March 12, 1959     2 Sheets-Sheet 1

INVENTOR
BURT J. BITTNER

BY Cyrus D. Samuelson
ATTORNEY

Nov. 28, 1961    B. J. BITTNER    3,010,153
CONSTRUCTION OF PARABOLOID SURFACES
Filed March 12, 1959    2 Sheets-Sheet 2

INVENTOR.
BURT J. BITTNER
BY
Cyrus D. Samuelson
ATTORNEY

United States Patent Office 3,010,153
Patented Nov. 28, 1961

3,010,153
CONSTRUCTION OF PARABOLOID SURFACES
Burt J. Bittner, Albuquerque, N. Mex., assignor to Gulton Industries, Inc., Metuchen, N.J., a corporation of New Jersey
Filed Mar. 12, 1959, Ser. No. 799,015
11 Claims. (Cl. 18—26)

This invention relates to the construction of bodies having hollow paraboloid surfaces. There are numerous practical applications for paraboloids because of their unique characteristic of reflecting, in parallel beams, radiant energy originating at their respective foci, or vice versa, of gathering all the parallel beams which impinge on their surfaces to a single focal point. Accordingly, parabolic reflectors are utilized for headlight reflectors, in telescopes, for microwave antennas, in solar furnaces, and for many other purposes. In accordance with prior practice, the fabrication of a parabolic reflector was a long, involved process which comprised carefully computing the form of the desired surfaces and casting and grinding it according to the specified mathematical tolerances as determined by the wavelengths of the energy to be applied. When sheet metal is used to form a paraboloid reflector, a spinning process, which comprises machining the metal to an accurate mold, may also be employed.

Recently, a much simpler technique for forming paraboloid surfaces has been described in an article entitled "Epoxy Parabolic Mirrors" by Paul B. Archibald in Modern Plastics for August 1957. This involves placing an air-solidifying liquid, such as an epoxy resin, or the like, in a cylindrical container and spinning it about the principal axis of the container while the liquid gradually hardens. The epoxy resin, as it hardens, assumes a parabolic shape. The paraboloid thus formed has a focal length which may be controlled by the speed of rotation of the container.

This method is simple and effective, permitting paraboloids of any specific, desired focal length to be readily constructed. However, certain mechanical difficulties arise in carrying out the process, because of the fact that vibrations, due to the rotational drive or turntable, are transmitted to the liquid being rotated, thereby causing ripples to form on the surface, which, in the case of a paraboloid mirror 36" in diameter, formed from epoxy resin, were large enough to be observed with the naked eye. Moreover, in accordance with the process described by Archibald, careful initial measurements and adjustments are required to properly center the container with respect to the axis of rotation of the turntable.

Accordingly, it is the general object of the present invention to improve the manufacture of bodies having paraboloid surfaces; and more particularly, to improve the liquid-spinning technique so as to produce paraboloids which are substantially free from ripples caused by vibration of the turntable mechanism with respect to the container.

These and other objects are attained in accordance with the present invention by hydraulically floating the container of air-solidifying liquid within another, slightly larger, container during the spinning operation. In accordance with the process of the present invention, the supporting container is then mounted on a turntable which is spun at a rotational rate chosen to give a desired focal length to a resultant parabolic surface.

This method has several specific advantages over the method described herein above, in that: first, the vibrations due to the turntable are absorbed in the supporting liquid; and second, precise adjustment or centering of the primary container with respect to the supporting container and the turntable is unnecessary since this is accomplished by the rotary motion of the supporting liquid.

Figure 2:
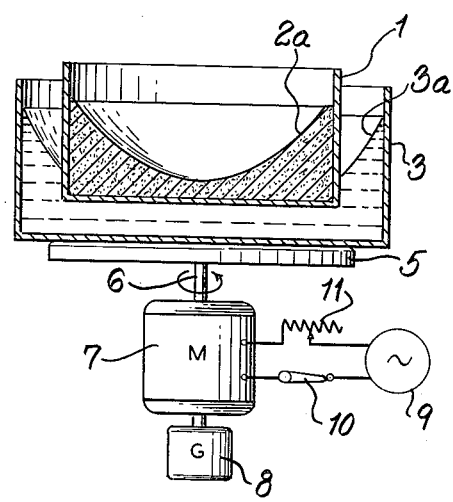
Figure 3A:
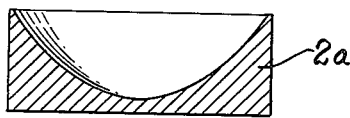
Figure 3B:
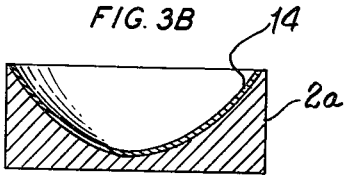
Figure 3C:
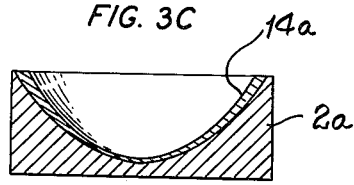
Figure 3D:
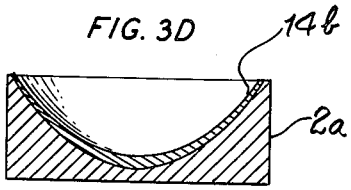
Figure 4:
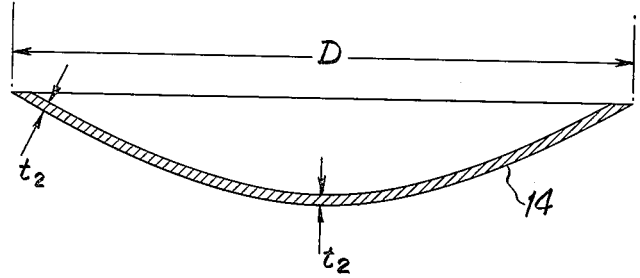
Figure 5:
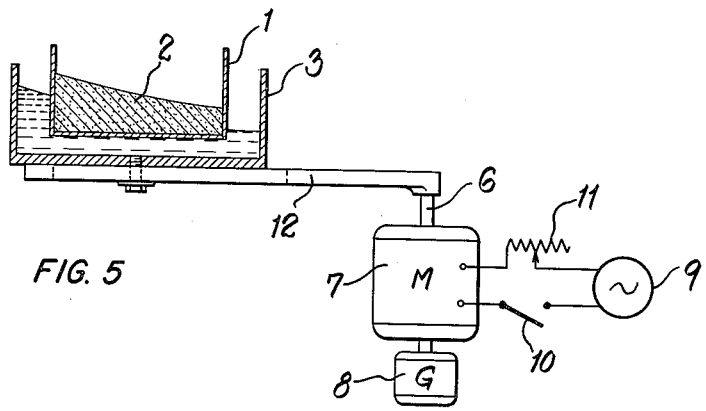
Figure 6:
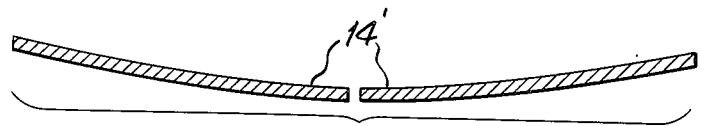

Other objects, features and advantages of the present invention will be apparent from a study of the detailed description when taken in connection with the accompanying drawings wherein:

FIGURE 1 shows an apparatus assemblage designed to carry out the technique of the present invention, at rest,
FIGURE 2 shows the assemblage of FIGURE 1 in rotation,
FIGURE 3A shows a primary mold formed by the process of the present invention,
FIGURE 3B shows a paraboloid shell of uniform thickness formed in the mold of Figure 3A by repeating the rotation process at the same speed,
FIGURES 3C and 3D show paraboloid shells which are respectively thinner, or thicker at the centers, depending on whether they were rotated at a speed which is greater than or less than the speed at which the mold was rotated,
FIGURE 4 shows a paraboloid section formed in accordance with FIGURE 3B after removal from the mold,
FIGURE 5 shows a modified technique in accordance with the present invention for making so-called "orange-peel" segments of a paraboloid, and
FIGURE 6 shows, in cross-section, a pair of these segments, after removal from the mold.

It can be shown mathematically that when a liquid is revolved in a horizontal plane, the free surface takes the form of a paraboloid, a parabola of revolution. ("Fluid Mechanics," R. C. Binder, 3rd Edition, 1955, Prentice-Hall, New York). Moreover, it can further be shown that, since the equation of the parabola is:

$$y^2 = 4fx \tag{1}$$

the focal length $f$ of the paraboloid so formed is a function of the speed of rotation. This can be expressed more simply by the following formula:

$$f = \frac{17.710}{N^2} \tag{2}$$

where $N$ represents the rotational speed in revolutions per minute. The density and viscosity of the liquid rotated does not affect the focal length of the paraboloid.

In practice, the process of the present invention is carried out by the following steps.

Referring to FIGURE 1, a container 1 is chosen, the size and shape of which depends on the size of the paraboloid it is desired to construct. In the present illustrative example, container 1 is a cylinder, of thin-sheet steel, about .030" thick, having an overall diameter of 36" and a depth of 8".

In the present example, for the first step of forming mold, a plaster of Paris type material having a shrinkage factor of less than about three percent, was used. This can be obtained in powder form under the trade name "Hydrocal," type "B–1L," from the U. S. Gypsum Company, 300 W. Adams Street, Chicago 6, Illinois. Four to five parts by weight of powder are mixed with one part of water. This forms a liquid 2 having about the consistency of heavy cream, which is poured into the container 1 to a depth of about 5" to 8" for a paraboloid whose focal length is to be approximately 14½".

A second container 3, which in the present illustration may be thin-sheet steel with a thickness of about .020", having a diameter of approximately 36" to 37" and a depth of 5", is filled with water to overflowing. I have found that it is satisfactory for containers 1 and 3 to be of the same size with a slight taper toward the bottom so that if the water or other liquid were not present in container 3, the two containers would nest together. As an alternative to water, any other liquid may be employed for this purpose provided it is chemically inert to the containers, does not solidify or evaporate at the temperatures used, and is sufficiently dense to float the container 1 and its contents.

The container 1 and its contents are floated within the container 3. The latter is screwed, or otherwise fixed, in a roughly centered position on the horizontal turntable 5, which is fixed to an axial shaft 6 driven to rotate by motor 7. The latter may assume any of the forms well-known in the art, such as that of a conventional electric motor 7, including a governor 8, and the necessary system of gears, connected to produce uniform rotation at rates up to several hundred revolutions per minute. The motor 7 is energized from a conventional 60-cycle source 9 through a single-throw, single-pole switch 10. The speed of motor 7 is controlled by adjusting the rheostat 11.

Assume that it is desired to form a paraboloid mold having a focal length of 18 inches, and a three foot maximum diameter perpendicular to the axis of rotation. The switch 10 is closed and the rheostat 11 is adjusted so that motor 7 drives shaft 6 and turntable 5 at a rotational speed of 36 revolutions per minute.

Referring to FIGURE 2, while turntable 5 is rotating, liquid 2 in container 1 assumes the paraboloid form 2a; and the suporting liquid 3 also assumes paraboloid form 3a on the free-surface edge sections. Due to the centrifugal force during rotation, the supporting liquid 3, the container 1, and its contents, are precisely centered about the axis of rotation. The uniform rate of rotation is maintained for a period of about two hours at a temperature of about 80° F. (a stable temperature), during which period the plaster of Paris type liquid 2 solidifies into a mold of the paraboloid form indicated by 2a.

It is apparent that on the basis of the formula set forth in Equation 2 hereinbefore, the focal length $f$ of the paraboloid surface, so produced, may be varied in accordance with the rotational speed. For example, a higher speed of 81 revolutions per minute would produce a paraboloid having a focal length of approximately 1.8″, and a lower speed of 31.5 revolutions per minute would produce a longer focal length of approximately 20″.

After the formation of the mold 2a, the next step is the formation of a paraboloid shell of the desired focal length and thickness. This is carried out by using any liquid which pours readily, and which solidifies with a smooth surface within a reasonable length of time, with linear shrinkage of less than about three percent, and which may be easily removed from the mold because it does not bond to the mold. In the present example, an epoxy resin was employed, that is, a condensation product derived from a primary reaction of epichlorohydrin with bisphenol. The epoxy resin used in the present illustration was liquid at room temperature; it had a viscosity of between 135 and 195 poises, contained between 185 and 205 grams of resin for one gram-equivalent of epoxide, and weighed approximately 97 pounds per gallon. Such a resin may be otained from the Shell Chemical Corporation under the trade name "Epon 828." However, any epoxy resin, which is liquid at room temperature, is believed to be suitable when used with a proper hardener. The hardener employed in the present instance was 6 percent by weight of piperidine.

The mixture so formed was poured into the mold 2a and heated up to and maintained at a temperature of about 190 degrees centigrade, while being rotated for a period of about eight hours, or until shell 14 hardened within the mold 2a. Assuming that the turntable 5 is rotated at 36 revolutions per minute (the speed of rotation used initially to form the mold), shell 14 will assume the same parabolic curvature as the initial mold, and, hence, will have the same thickness at all points, the absolute value of the thickness depending on the amount of liquid used. In the present case, using a 36″ diameter mold which is filled to overflowing, the shell 14 had a thickness of about .070″.

Assuming however, that the turntable is rotated at a greater speed than that at which the mold 2a was formed, for example 38 revolutions per minute, then the resulting shell will take a different form 14a, which is about .030″ thick at the center and .120″ thick at the edges. This is indicated in FIGURE 3C.

Alternatively, if the turntable is rotated at a slower rate of speed than the initial mold speed, the shell 14b formed is .130″ thick at the center and .050″ thick at the edges, as indicated in FIGURE 3D of the drawings.

Assuming the first case, the shell 14, when removed from the mold 2a, has the form indicated in FIGURE 4 of the drawings. In the present illustration, the shell has a diameter of about 3 feet, a focal length of 18″, and thickness of about .070″.

The parabolic structure described may be strengthened or made thicker by spinning additional layers on the surface of the original parabolic layer, at either the same or different rates of rotation. For added strength, another modification involves the addition of one or more layers of Fiberglas cloth, which are applied after one epoxy layer solidifies, and before another layer is applied. These Fiberglas layers are added for every .02″ thickness of epoxy resin. The final inner surface of epoxy resin is at least .01″ thick and contains no Fiberglas cloth. As explained in the article by Archibald, supra, this technique is found to produce a thin shell of considerably added strength to that previously described. Other methods of reinforcement are also mentioned by Archibald, such as foamed-in-place plastic backing. Another feature of the present method of forming paraboloids is that structural members can be permanently molded into the assembly, as desired.

Moreover, it will be apparent that the process is by no means limited to the use of epoxy resins, or other non-metallic solids; but that metals of low melting point, such as, for example, Rose's metal, may also be readily employed by simply controlling the temperature during the spinning process, to cause the metal to solidify slowly enough so that it does not contain cracks or fissures.

Either by evaporation, or by other well-known techniques, metallic finishes of, for example, gold, silver, nickel, and/or other metals, or combinations of metals, can readily be applied to the non-metallic paraboloid surfaces, thereby providing reflectors which are accurately formed to within small tolerances.

It has been found that paraboloids constructed by the foregoing process have smooth, unrippled surfaces, which are capable of focusing light sharply enough to burn holes on paper placed at their respective focal points.

In practice, paraboloids have been constructed by the present process having focal lengths of from two to eighty inches, and to the following specifications:

| Diameter "D" (Inches) | Surface finish (microinches) | Maximum tolerance (inches) |
|---|---|---|
| 6 | 5 to 18 | .0003 |
| 8 | 10 to 20 | .0007 |
| 15 | 10 to 30 | .0009 |
| 36 | 10 to 30 | .006 |

In the foregoing table, the diameter "D" is defined as the maximum diameter of the parabolic section in the plane perpendicular to the principal axis of the paraboloid.

"Surface Finish" describes the maximum deviation from the desired surface within any specific square inch.

"Maximum Tolerance" refers to the average surface finish compared to the theoretical value.

It is also possible to construct larger paraboloids, up to for example, 10 feet or more in diameter, by another modification of the described process. This involves forming individual or so-called "orange-peel" parabolic sections, which are matched and cemented together to form the larger paraboloid. As illustrated in FIGURE 5, this may be carried out by mounting the hydraulically floated container of liquid, of the construction previously described with reference to FIGURES 1 and 2, on an arm 12 which is rigidly coupled to the rotating axle 6. Thus, a specific "orange-peel" section is spun, the form being determined by the radius of rotation (the length of the supporting arm 12). It is a simple matter to compute the arm-length for any particular application. In fact, for this purpose the supporting arm 12 can be made of adjustable length.

Assuming the length of arm 12 to be half of the desired paraboloid diameter D, two half sections 14' can be made and positioned, as indicated in FIGURE 6. Numerous other combinations can be made and similarly assembled.

By forming these "orange-peel" sections separately as herein described and then bolting them or otherwise holding them together, it is possible to form very large paraboloids or portions of paraboloids using much smaller containers than are necessary to form the same size paraboloid in one piece.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. An apparatus for forming a body having a paraboloid surface which comprises in combination a first container constructed and arranged to support a quantity of liquid which solidifies within a given time interval, and which shrinks less than about three percent on solidification, means for hydraulically supporting said first container, said means comprising a second container of similar shape to that of said first container, a supporting liquid contained in said second container, said supporting liquid having sufficient density to float said first container and its contents so that the upper edge of said first container protrudes above the surface of said supporting liquid, and means for rotating said second container in a horizontal plane at a controlled rate of rotation for a period exceeding said given time interval.

2. An apparatus in accordance with claim 1 wherein said rotation is about a vertical axis substantially centered with respect said second container.

3. An apparatus in accordance with claim 1 wherein said rotation in a horizontal plane takes place about a vertical axis which is substantially laterally displaced with respect to the center of said second container.

4. Apparatus for forming a body having a paraboloid surface which comprises in combination a first container, a mold having a paraboloid surface section mounted in said container, said mold constructed and arranged to support a liquid which solidifies within a given time interval, and which shrinks less than about three percent on solidification, means for hydraulically supporting said first container, said means comprising a second container of similar shape, a supporting liquid contained in said second container, and having sufficient density to float said first container and its contents with the upper edge of said first container protruding above the surface of said supporting liquid, and means for rotating said second container in a horizontal plane at a controlled rate of rotation for a period exceeding said given time interval.

5. The method of forming a body having a paraboloid surface which comprises the steps of pouring a first liquid which solidifies within a prescribed length of time into a first container in such a manner that said first liquid has a free surface in a horizontal plane, hydraulically supporting said first container in a second container, and rotating said second container at a controlled rate in a horizontal plane for said prescribed length of time.

6. The method in accordance with claim 5 wherein said second container is rotated about a vertical axis substantially centered with respect thereto.

7. The method in accordance with claim 5 wherein said second container is rotated about a vertical axis which is substantially laterally displaced with respect to the center of said second container.

8. The method of forming a body having a paraboloid surface which comprises the steps of pouring into a first container a first liquid which solidifies within a predetermined length of time, supporting said first container hydraulically in a second container in such a manner that said liquid has a free surface in a horizontal plane, rotating said second container at a uniform rate in a horizontal plane for at least the time interval required for said first liquid to solidify to form a mold having a paraboloid surface, pouring a quantity of a second liquid which solidifies within a second predetermined length of time into said mold, again rotating said second container at a uniform rate in a horizontal plane for at least the time required for said second liquid to solidify into a shell having a paraboloid surface.

9. The method in accordance with claim 8 wherein the rate of rotation of said second liquid while it sets substantially exceeds the rate of rotation of said first liquid while it sets, thereby producing a shell which is substantially thinner at the center than at the edges thereof.

10. The method in accordance with claim 8 wherein the rate of rotation of said second liquid while it sets is substantially less than the rate of rotation of said first liquid while it sets, thereby producing a shell which is substantially thicker at the center than at the edges thereof.

11. The method of forming a body having a paraboloid surface which comprises the steps of pouring a plaster of Paris type liquid into a container, supporting said container hydraulically in a second container in such a manner that said liquid has a free surface in a horizontal plane, rotating said second container at a uniform rate in a horizontal plane for the time interval required for said plaster of Paris type liquid to solidify into a mold, pouring a quantity of a liquid epoxy resin together with a hardener into said mold, again rotating said second container at a uniform rate in a horizontal plane until said epoxy resin solidifies into a shell having a paraboloid surface, and removing said shell from said mold.

References Cited in the file of this patent

UNITED STATES PATENTS

| 669,119 | Krank | Mar. 5, 1901 |
| 2,671,932 | Pique | Mar. 16, 1954 |
| 2,719,327 | Pique | Oct. 4, 1955 |
| 2,880,468 | Mooney et al. | Apr. 7, 1959 |

OTHER REFERENCES

Archibald: "Epoxy Parabolic Mirrors," Modern Plastics, August 1957, pp. 116–117.